(12) United States Patent
Armstrong et al.

(10) Patent No.: US 8,617,763 B2
(45) Date of Patent: Dec. 31, 2013

(54) INTERNAL REFORMING ANODE FOR SOLID OXIDE FUEL CELLS

(75) Inventors: Tad Armstrong, Burlingame, CA (US); Emad El Batawi, Sunnyvale, CA (US); Eric Petersen, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 244 days.

(21) Appl. No.: 12/850,885

(22) Filed: Aug. 5, 2010

(65) Prior Publication Data

US 2011/0039183 A1  Feb. 17, 2011

Related U.S. Application Data

(60) Provisional application No. 61/272,056, filed on Aug. 12, 2009.

(51) Int. Cl.
*H01M 8/12* (2006.01)
*H01M 4/90* (2006.01)

(52) U.S. Cl.
USPC ........... 429/486; 429/482; 429/489; 429/496; 429/527; 429/528

(58) Field of Classification Search
USPC ......... 429/484–489, 532–534, 482, 495–496, 429/527–529
See application file for complete search history.

(56) References Cited

U.S. PATENT DOCUMENTS

| | | | |
|---|---|---|---|
| 4,052,532 | A | 10/1977 | Tannenberger |
| 4,272,353 | A | 6/1981 | Lawrance et al. |
| 4,426,269 | A | 1/1984 | Brown et al. |
| 4,459,340 | A | 7/1984 | Mason |

(Continued)

FOREIGN PATENT DOCUMENTS

| | | |
|---|---|---|
| CN | 101147285 A | 3/2008 |
| CN | 101295792 A | 10/2008 |

(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.63}MnO_3$," Electrochemical Society Proceedings, 2001, p. 476-485, vol. 2001-16.

(Continued)

*Primary Examiner* — Raymond Alejandro
*Assistant Examiner* — Helen McDermott
(74) *Attorney, Agent, or Firm* — The Marbury Law Group PLLC

(57) ABSTRACT

A solid oxide fuel cell (SOFC) includes a cathode electrode, a solid oxide electrolyte, and an anode electrode having a first portion and a second portion, such that the first portion is located between the electrolyte and the second portion. The anode electrode comprises a cermet comprising a nickel containing phase and a ceramic phase. The first portion of the anode electrode contains a lower porosity and a lower ratio of the nickel containing phase to the ceramic phase than the second portion of the anode electrode. The nickel containing phase in the second portion of the anode electrode comprises nickel and at least one other metal which has a lower electrocatalytic activity than nickel.

11 Claims, 9 Drawing Sheets

1

(56) References Cited

U.S. PATENT DOCUMENTS

| | | |
|---|---|---|
| 4,575,407 A | 3/1986 | Diller |
| 4,686,158 A | 8/1987 | Nishi et al. |
| 4,792,502 A | 12/1988 | Trocciola et al. |
| 4,804,592 A | 2/1989 | Vanderborgh et al. |
| 4,847,173 A | 7/1989 | Mitsunnaga et al. |
| 4,898,792 A | 2/1990 | Singh et al. |
| 4,913,982 A | 4/1990 | Kotchick et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Okuyama et al. |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,543,239 A | 8/1996 | Virkar et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett |
| 5,741,605 A | 4/1998 | Gillett et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,106,964 A | 8/2000 | Voss et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B1 | 8/2002 | DuBose et al. |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,632,554 B2 | 10/2003 | Doshi et al. |
| 6,677,070 B2 | 1/2004 | Kearl |
| 6,682,842 B1 | 1/2004 | Visco et al. |
| 6,767,662 B2 | 7/2004 | Jacobson |
| 6,787,261 B2 | 9/2004 | Ukai |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,550,217 B2 | 6/2009 | Kwon |
| 7,563,503 B2 | 7/2009 | Gell |
| 7,601,183 B2 | 10/2009 | Larsen |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2002/0177031 A1 | 11/2002 | Doshi et al. |
| 2003/0035989 A1* | 2/2003 | Gorte et al. ............... 429/30 |
| 2003/0162067 A1 | 8/2003 | McElroy |
| 2003/0165732 A1 | 9/2003 | McElroy |
| 2003/0196893 A1 | 10/2003 | McElroy |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0166070 A1 | 7/2006 | Hickey et al. |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue |
| 2007/0275292 A1 | 11/2007 | Sin Xicola et al. |
| 2007/0287048 A1 | 12/2007 | Couse |
| 2008/0029388 A1 | 2/2008 | Elangovan |
| 2008/0075984 A1 | 3/2008 | Badding |
| 2008/0076006 A1 | 3/2008 | Gottmann et al. |
| 2008/0096080 A1 | 4/2008 | Batawi |
| 2008/0102337 A1 | 5/2008 | Shimada |
| 2008/0166618 A1 | 7/2008 | Larsen et al. |
| 2008/0254336 A1 | 10/2008 | Batawi |
| 2008/0261099 A1 | 10/2008 | Nguyen |
| 2009/0029195 A1 | 1/2009 | Gauckler |
| 2009/0061284 A1 | 3/2009 | Blennow et al. |
| 2009/0068533 A1 | 3/2009 | Fukasawa et al. |
| 2009/0148742 A1* | 6/2009 | Day et al. ............... 429/33 |
| 2009/0186250 A1 | 7/2009 | Narendar et al. |
| 2009/0214919 A1 | 8/2009 | Suzuki |
| 2009/0291347 A1 | 11/2009 | Suzuki |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-281438 | 10/2000 |
| JP | 2004-531857 A | 10/2004 |
| JP | 2005166284 A * | 6/2005 |
| JP | 2008-239353 A | 10/2008 |
| JP | 2008-541336 A | 11/2008 |
| JP | 2009-110933 A | 5/2009 |
| KR | 20020092223 A | 12/2002 |
| KR | 20070095440 A | 9/2007 |
| KR | 20080010737 A | 1/2008 |

(56) References Cited

FOREIGN PATENT DOCUMENTS

| | | |
|---|---|---|
| KR | 20080097971 | 11/2008 |
| KR | 100886239 B1 | 2/2009 |
| KR | 20090061870 A | 6/2009 |
| WO | WO2004/093214 | 10/2004 |
| WO | WO2005/041329 | 5/2005 |
| WO | WO 2006079558 A1 | 8/2006 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.

L.G. Austin, "Cell & Stack Construction: Low Temperature Cells," NASA SP-120, 1967.

EG & G Services, Parsons, Inc., SAIC, Fuel Cell Handbook, 5th Edition, USDOE, Oct. 2000, p. 9-1-9.4, and 9-12-9-14.

J.M. Sedlak, et al., "Hydrogen Recovery and Purification Using the Solid Polymer Electrolyte Electrolysis Cell," Int. J. Hydrogen Energy, vol. 6, p. 45-51, 1981.

Dr. Ruhl, "Low Cost Reversible Fuel Cell System," Proceedings of the 2000 U.S. DOE Hydrogen Program Review, Jun. 15, 2000, NREL/CP-570-30535.

Low Cost, Compact Solid Oxide Fuel Cell Generator, NASA Small Business Innovation Research Program.

Low Cost, High Efficiency Reversible Fuel Cell (and Electrolyzer) Systems, Proceedings of the 2001 DOE Hydrogen Program Review NREL/CP-570-30535.

Milliken et al., "Low Cost, High Efficiency Reversible Fuel Cell Systems," Proceedings of the 2002 U.S. DOE Hydrogen Program Review, NREL/CP-610-32405.

K. Eguchi et al., Power Generation and Steam Electrolysis Characteristics of an Electrochemical Cell with a Zirconia or Ceria based Electrode, Solid State Ionics, 86 88, 1996, p. 1245-49.

F. Mitlitsky et al., "Regenerative Fuel Cells for High Altitude Long Endurance Solar Powered Aircraft," $28^{th}$ Intersociety Energy Conversion Engineering Conference (IECED), Jul. 28, 1993, UCRL-JC-113485.

Small, Ultra Efficient Fuel Cell Systems, Advanced Technology Program, ATP 2001 Competition, Jun. 2002.

F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.

Ralph et al., "Cathode Materials for Reduced-Temperature SOFCs," Journal of the Electrochemical Society, 2003, p. A1518-A1522, vol. 150.

Simmer et al., "Development of Fabrication Techniques and Electrodes for Solid Oxide Fuel Cells," Electrochemcial Society Proceedings, p. 1050-1061, vol. 2001-16.

Yamamoto et al., "Electrical Conductivity of Stabilized Zirconia with Ytterbia and Scandia," Solid State Ionics, v79, p. 137-142, Jul. 1995.

Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.

Lybye et al., "Effect of Transition Metal Ions on the Conductivity and Stability of Stabilized Zirconia," Ceramic Engineering and Science Proceedings, v27, n4, p. 67-78, 2006.

International Preliminary Report on Patentability issued in PCT Application No. PCT/US2010/045182, mailed on Feb. 23, 2012.

PCT International Search Report and Written Opinion of the International Searching Authority for PCT Application PCT/US2010/045182, mailed Apr. 27, 2011.

\* cited by examiner

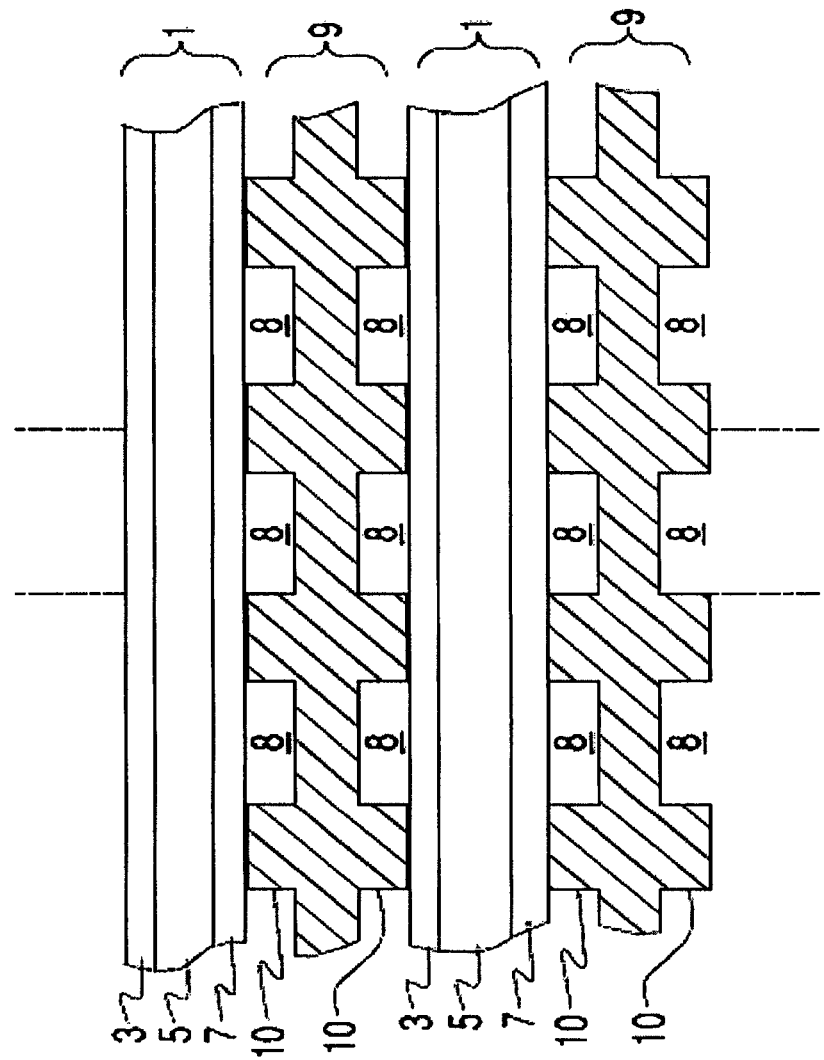

INTERNAL REFORMING ANODE FOR SOLID OXIDE FUEL CELLS

BACKGROUND OF THE INVENTION

The present invention is directed to fuel cell components generally and towards development of solid oxide fuel cell anode materials that will allow for the direct internal reforming of hydrocarbon fuels on the anode in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, propane, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

Anode electrodes operating under conditions of extreme fuel starvation are usually irreversibly damaged. Such starvation conditions are usually encountered in stacks where isolated repeat elements (i.e., specific fuel cells) obtain less fuel than their neighboring elements (i.e., the neighboring fuel cells). These elements witness effective fuel utilization in excess of 100%. Similar conditions may arise during system transitions or operating anomalies where the fuel supply to the cell does not correspond to the current drawn. Under these circumstances, the oxygen ion flux to the anode will oxidize the anode constituents. Nickel present at the three phase boundary of traditional anodes will instantaneously oxidize. The phase change from Ni metal to NiO is accompanied by a change in volume that causes mechanical damage at the anode/electrolyte interface. This mechanical damage is characterized by delamination of the electrode from the electrolyte which increases the specific resistance of the cell and dramatically decreases the stack performance To avoid oxidation of the nickel and mechanical damage of the electrode electrolyte interface, which leads to delamination, one prior art solution was to employ an all ceramic anode. While the ceramic anodes show better stability in starvation conditions, they are associated with high polarization losses.

Solid oxide fuel cells operate using hydrocarbon based fuel. SOFC operate in one of two modes; a pre-reforming mode or an internally reforming mode. In the pre-reforming mode, the hydrocarbon fuel is pre-reformed into a syn-gas ($CO+H_2$) before entering the fuel cell. The anode provides an electro-catalytically active surface for oxidation of the pre-reformed fuel and ensures sufficient oxide-ionic and electronic conduction. In the internally reforming mode, the hydrocarbon fuel enters the solid oxide fuel cell where it is exposed to the anode. As in the pre-reforming mode, the anode provides both fuel oxidation and ionic and electronic transport. However, the anode must also internally reform the hydrocarbon fuel. State-of-the-art anodes are composites. These anodes are composed of an electrocatalytic material that is primarily an electronic conductor, such as Ni metal, and an oxide-ionic conductive material. Traditionally, state of the art anodes are Ni-ceria and Ni-zirconia. These anodes operating under internal reforming mode are susceptible to failure by anode delamination, structural failure at the leading edge where the hydrocarbon fuel enters the cell, or nickel dusting from internal Ni-carbide formation resulting in embrittlement.

SUMMARY OF THE INVENTION

A solid oxide fuel cell (SOFC) includes a cathode electrode, a solid oxide electrolyte, and an anode electrode having a first portion and a second portion, such that the first portion is located between the electrolyte and the second portion. The anode electrode comprises a cermet comprising a nickel containing phase and a ceramic phase. The first portion of the anode electrode contains a lower porosity and a lower ratio of the nickel containing phase to the ceramic phase than the second portion of the anode electrode. The nickel containing phase in the second portion of the anode electrode comprises nickel and at least one other metal which has a lower electro-catalytic activity than nickel.

BRIEF DESCRIPTION OF THE DRAWINGS

FIG. 4 illustrates a side cross sectional view of a SOFC stack of an embodiment of the invention.

FIG. 5A shows an anode of a comparative example. FIG. 5B illustrates an anode of an example of the invention.

DETAILED DESCRIPTION OF THE EMBODIMENTS

Figure 1:
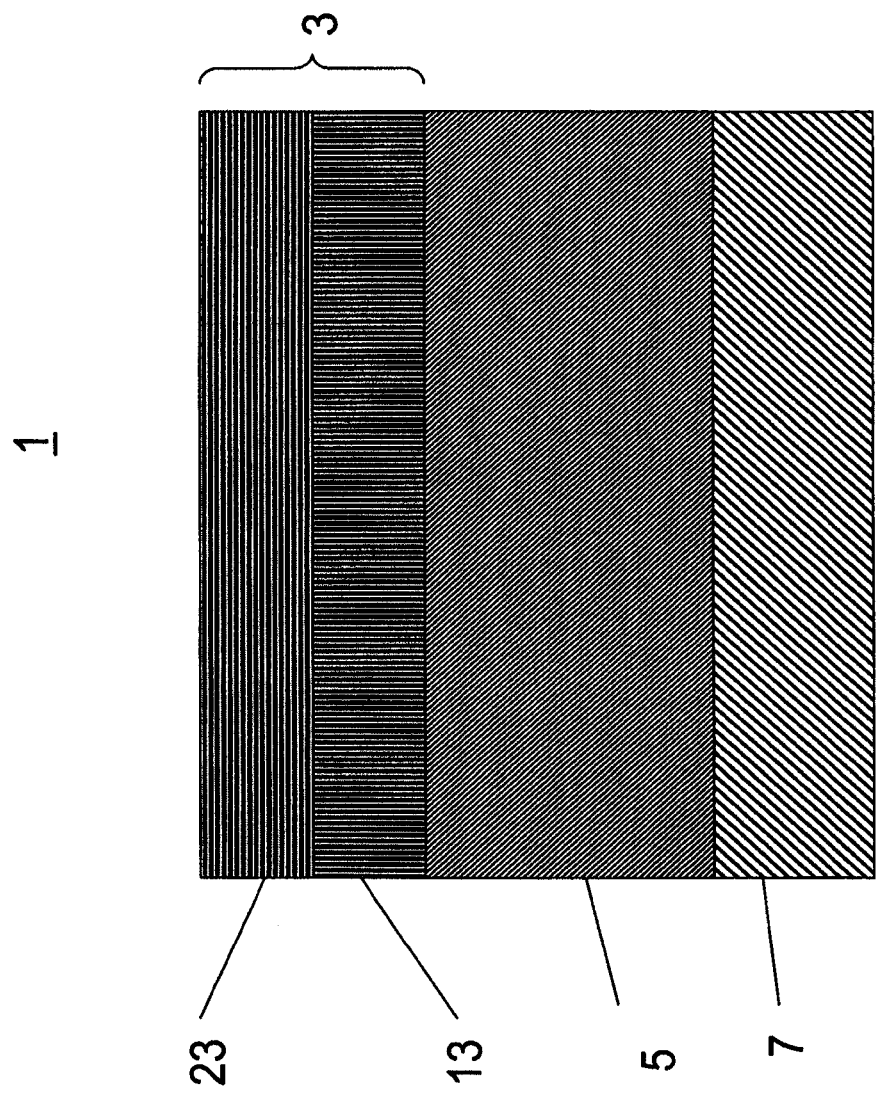
FIGS. 1 and 2 illustrate side cross-sectional views and FIG. 3 illustrates a top view of SOFCs of the embodiments of the invention.

In one embodiment of the invention, an anode electrode for a solid oxide fuel cell allows for the direct internal reforming of hydrocarbon fuels on the anode and reliable operation under fuel starvation conditions. The internal reforming anode will eliminate the need for a pre-reformer or an external reformer, thus significantly reducing the cost. The solid oxide fuel cell (SOFC) comprises a cathode electrode, a solid oxide electrolyte, and an anode electrode comprising a first portion and a second portion, such that the first portion is located between the electrolyte and the second portion. The anode electrode comprises a cermet comprising a nickel containing phase and a ceramic phase. The first portion of the anode electrode is a cermet comprising a nickel containing phase and a ceramic phase with a lower porosity and a lower ratio of the nickel containing phase to the ceramic phase than the second portion of the anode electrode.

In one embodiment, the second portion further comprises a nickel containing phase in which the highly electrocatalytically active nickel is substituted in part by a metal which has a lower electrocatalytic activity than nickel (including non-electrocatalytic metals). The metal may comprise cobalt (Co) and/or copper (Cu) which is preferably but not necessarily alloyed with nickel to decrease the catalytic activity of the nickel containing phase. Decreased catalytic activity results in lower thermo-mechanical stress, which the inventors believe leads to lower anode delamination and mechanical damage. The substituted nickel cermet, such as a nickel alloy cermet, for example a Ni—Co alloy cermet, also exhibits a lower electrocatalytic activity in comparison with the pure Ni cermet where all other parameters are kept constant.

In another embodiment, the entire anode electrode or only the second portion of the anode could consist essentially of an electrocatalytic ceramic phase, such as a doped ceria, for example SDC, (i.e., anode with no intentionally introduced nickel in the anode, but with possible background impurities and materials which do not affect the electrocatalytic behavior of the anode). A porous or mesh current collector of an electrically conductive material is formed on the anode. The current collector may comprise an electrocatalytic or non-electrocatalytic material.

The embodiments of the invention provide anode electrodes for solid oxide fuel cells, such as reversible SOFCs (i.e., SORFC) and non-reversible SOFCs, that do not irreversibly deteriorate under conditions of extreme fuel starvation. The embodiments of the invention conduct internal reformation of hydrocarbon based fuels without mechanical damage to the anode. The anode electrodes display improved output efficiency and polarization losses comparable to prior art Ni-YSZ anodes. Therefore, the anode conducts fuel oxidation, ionic and electronic transport, and reforming of the hydrocarbon fuel under conditions of fuel starvation. Furthermore, after a starvation event, the performance of the anode electrodes of the embodiments of the invention is hardly affected and there is minimal mechanical deterioration of the anode.

The anode electrode of one embodiment of the invention is a cermet comprising a nickel containing phase (i.e., a metal phase which includes nickel) and a ceramic phase. The nickel containing phase preferably contains a metal, such as nickel, cobalt and/or copper, in a reduced state. This phase forms a metal oxide when it is in an oxidized state. Thus, the anode electrode is preferably annealed in a reducing atmosphere prior to operation to reduce the nickel oxide to nickel. The nickel containing phase includes other metal(s) in addition to nickel. For example, the nickel containing phase may contain an alloy of nickel and an additional metal, such as cobalt or copper. The metal phase is preferably finely distributed in the ceramic phase, with an average grain size less than 500 nanometers, such as 100 to 400 nanometers, to reduce the stresses induced when nickel converts to nickel oxide. The ceramic phase preferably comprises a doped ceria, such as a samaria, gadolinia or yttria doped ceria (in other words, the ceria may contain Sm, Gd and/or Y dopant element which forms an oxide upon incorporation into the ceria). Preferably, the doped ceria phase composition comprises $Ce_{(1-x)}A_xO_2$, where A comprises at least one of Sm, Gd, or Y, and x is greater than 0.1 but less than 0.4. For example, x may range from 0.15 to 0.3 and may be equal to 0.2. Samaria doped ceria (SDC) is preferred. Furthermore, the doped ceria may be non-stoichiometric, and contain more than or less than two oxygen atoms for each one metal atom. Alternatively, the ceramic phase comprises a different mixed ionic and electrically conductive phase, such as a perovskite ceramic phase, such as $(La, Sr)(Mn,Cr)O_3$, which includes LSM, lanthanum strontium chromite, $(La_xSr_{1-x})(Mn_yCr_{1-y})O_3$ where $0.6 \le x \le 0.9$, $0.1 \le y \le 0.4$, such as x=0.8, y=0.2, etc.

In one embodiment of the invention, the anode electrode contains less nickel phase in a portion near the electrolyte than in a portion near the electrode surface distal from the electrode (i.e., the "free" electrode surface which faces away from the electrolyte). In another embodiment of the invention, the anode electrode contains less porosity in a portion near the electrolyte than in a portion near the "free" electrode surface distal from the electrode. In another embodiment of the invention, the anode electrode contains an additional metal, such as Co and/or Cu alloyed with the nickel, in a portion near the electrode surface distal from the electrolyte. If desired, the additional metal may be omitted from the portion of the anode near the electrolyte (i.e., no intentionally introduced Cu or Co, but possible unintentional background Co or Cu impurity or diffusion presence). Preferably, the anode electrode contains less nickel and less porosity in the portion near the electrolyte and an additional metal in the portion distal to the electrode.

In another embodiment the electrocatalytically active metal phase (e.g., Ni) is absent from the anode function layer. The anode functional layer is composed an electro-catalytically active oxide-ionic conductor, such as GDC or SDC. The purpose is to lower the catalytic activity of the oxide-ionic conducting phase to spread the reforming reaction across a greater length of the anode. The all-ceramic anode requires a current collector. The collector can be made of an electrically conductive wire or mesh or a thin, porous, electrically conductive layer. The collector may comprise an electrocatalytic material, such as a nickel mesh, or it may comprise a non-electrocatalytic material, such as a copper or silver mesh or wire, a copper coated nickel wire or mesh. Alternatively, the collector may comprise a silver wire or mesh coated with nickel.

FIG. 1 illustrates a solid oxide fuel cell (SOFC) 1 according to an embodiment of the invention. The cell 1 includes an anode electrode 3, a solid oxide electrolyte 5 and a cathode electrode 7. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as lanthanum strontium cobaltite $(La,Sr)CoO_3$, lanthanum strontium cobalt ferrite $(La,Sr)(Co,Fe)O_3$, etc., or metals, such as Pt, may also be used.

As shown in FIG. 1, the anode electrode 3 comprises a first portion 13 and a second portion 23. The first portion 13 is located between the electrolyte 5 and the second portion 23. As noted above, preferably, the first portion of the anode electrode 13 contains a lower ratio of the nickel containing phase to the ceramic phase than the second portion 23 of the anode electrode. Furthermore, preferably, the first portion of the anode electrode 13 contains a lower porosity than the second portion 23 of the anode electrode. In addition, the second portion 23 contains an additional metal alloyed with nickel, such as Co or Cu. Alternatively, the Cu or Co may be provided separately from Ni (e.g., not pre-alloyed) into the anode electrode. Thus, the porosity and the ratio of the nickel phase to the ceramic phase increases in as a function of thickness of the anode electrode 3 in a direction from the electrolyte 5 to the opposite surface of the anode electrode 3. The additional metal in the second portion is a step function. The first portion contains no additional metal, while the second portion contains a uniform concentration.

For example, the first portion 13 of the anode electrode may contain a porosity of 5-30 volume percent and a nickel phase content of 1 to 20 volume percent. The second portion 23 of the anode electrode may contain a porosity of 31 to 60 volume percent, a nickel phase content of 21 to 60 volume percent. The nickel containing phase contains between 1 and 50 atomic percent, such as 5-30 at % of an additional metal, such as cobalt and/or copper, and the balance nickel.

In one embodiment, the first 13 and the second 23 portions of the anode electrode 3 comprise separate sublayers. Thus, the first region 13 comprises a first sublayer in contact with the electrolyte 5 and the second region 23 comprises a second sublayer located over the first sublayer 13. The first sublayer 13 contains a lower porosity and lower nickel to doped ceria ratio than the second sublayer 23 The second sublayer 23 contains an additional metal, such as Co or Cu.

The first sublayer 13 may contain between 1 and 15 volume percent of the nickel containing phase, between 5 and 30 percent pores, such as between 5 and 20 or between 15 and 25 volume percent pores, and remainder the doped ceria phase. For example between 1 and 5 volume percent of the nickel containing phase, between 5 and 10 volume percent pores and remainder the doped ceria phase. The second sublayer 23 contains over 20 volume percent nickel containing phase, between 20 and 60 volume percent pores, such as between 40 and 50 percent pores, and remainder is the doped ceria phase. For example, it contains between 30 and 50 volume percent of the nickel containing phase (which contains 1-30 at %, such as 5-10 at % Co and/or Cu and balance Ni), between 30 and 50 volume percent pores and remainder the doped ceria phase. In the first sublayer 13, the volume ratio of the nickel containing phase to the doped ceria containing phase may range from 1:8 to 1:10, for example 1:9. In the second sublayer 23, the volume ratio of the nickel containing phase to the doped ceria containing phase may range from 3:1 to 5:1, for example 4:1. The first sublayer 13 may contain between 5 and 25 weight percent nickel containing phase, such as between 10 and 20 weight percent nickel containing phase, and between 75 and 95 weight percent doped ceria containing phase, such as between 80 and 90 weight percent doped ceria phase. The second sublayer 23 may contain between 60 and 85 weight percent nickel containing phase, such as between 70 and 75 weight percent nickel containing phase, and between 15 and 40 weight percent doped ceria containing phase, such as between 25 and 30 weight percent doped ceria phase. The optimum ratio of nickel to ceramic is determined by the requisite electronic conductivity, ionic conductivity, porosity, and electrocatalytic properties necessary for optimal anode performance.

Thus, the anode electrode 3 contains plurality of sublayers, each varying in composition, structure and nickel content. Each layer is approximately 3-30 microns thick, such as 5-10 microns thick, for example. Preferably, the first sublayer 13 is 3-6 microns thick and the second sublayer 23 is 6-10 microns thick for a total thickness of 9-16 microns. The first sublayer in contact with the electrolyte has a higher density and lower nickel content than the one or more sublayers further away from the electrolyte. A porosity gradient is established ranging from approximately 5-15% close to the electrolyte and increasing to about 50% at the anode electrode's free surface. The nickel content in the electrode increases in a similar manner as the porosity. The second sublayer, farther away from the electrolyte, has an additional metal, such as Co or Cu, alloyed with nickel.

In another embodiment of the invention, each of the first 13 and second 23 regions may comprise plural sublayers. For example, each region 13, 23 may contain two sublayers, such that the anode electrode 3 contains a total of four sublayers. In this case, the first region 13 comprises a first sublayer in contact with the electrolyte and a second sublayer located over the first sublayer, while the second region 23 comprises a third sublayer located over the second sublayer and a fourth sublayer located over the third sublayer. In this configuration, a porosity of the anode electrode increases from the first sublayer to the fourth sublayer and the nickel phase content of the anode electrode increases from the first sublayer to the fourth sublayer. In other words, the sublayer which contacts the electrolyte 5 has the lowest porosity and nickel phase content, while the sublayer which is located farthest from the electrolyte contains the highest porosity and nickel phase content (and the lowest doped ceria phase content).

For example, the first sublayer closest to the electrolyte 5 may contain between 1 and 5 volume percent of the nickel containing phase, between 5 and 15 volume percent pores and remainder the doped ceria phase. The second sublayer may contain between 6 and 20 volume percent of the nickel containing phase, between 20 and 40 volume percent pores and remainder the doped ceria phase. The third sublayer may contain between 25 and 35 volume percent of the nickel containing phase, between 30 and 50 volume percent pores and remainder the doped ceria phase. The fourth sublayer which is farthest from the electrolyte 5 may contain between 35 and 45 volume percent of the nickel containing phase (which includes 1-30 at %, such as 5-10 at % Cu and/or Co and balance Ni), between 40 and 60 volume percent pores, and remainder the doped ceria phase.

Fuel cell stacks are frequently built from a multiplicity of SOFC's 1 in the form of planar elements, tubes, or other geometries. Fuel and air has to be provided to the electrochemically active surface, which can be large. As shown in FIG. 4, one component of a fuel cell stack is the so called gas flow separator (referred to as a gas flow separator plate in a planar stack) 9 that separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material. An electrically conductive contact layer, such as a nickel contact layer, may be provided between the anode electrode and the interconnect. FIG. 4 shows that the lower SOFC 1 is located between two gas separator plates 9.

Furthermore, while FIG. 4 shows that the stack comprises a plurality of planar or plate shaped fuel cells, the fuel cells may have other configurations, such as tubular. Still further, while vertically oriented stacks are shown in FIG. 4, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Figure 2:
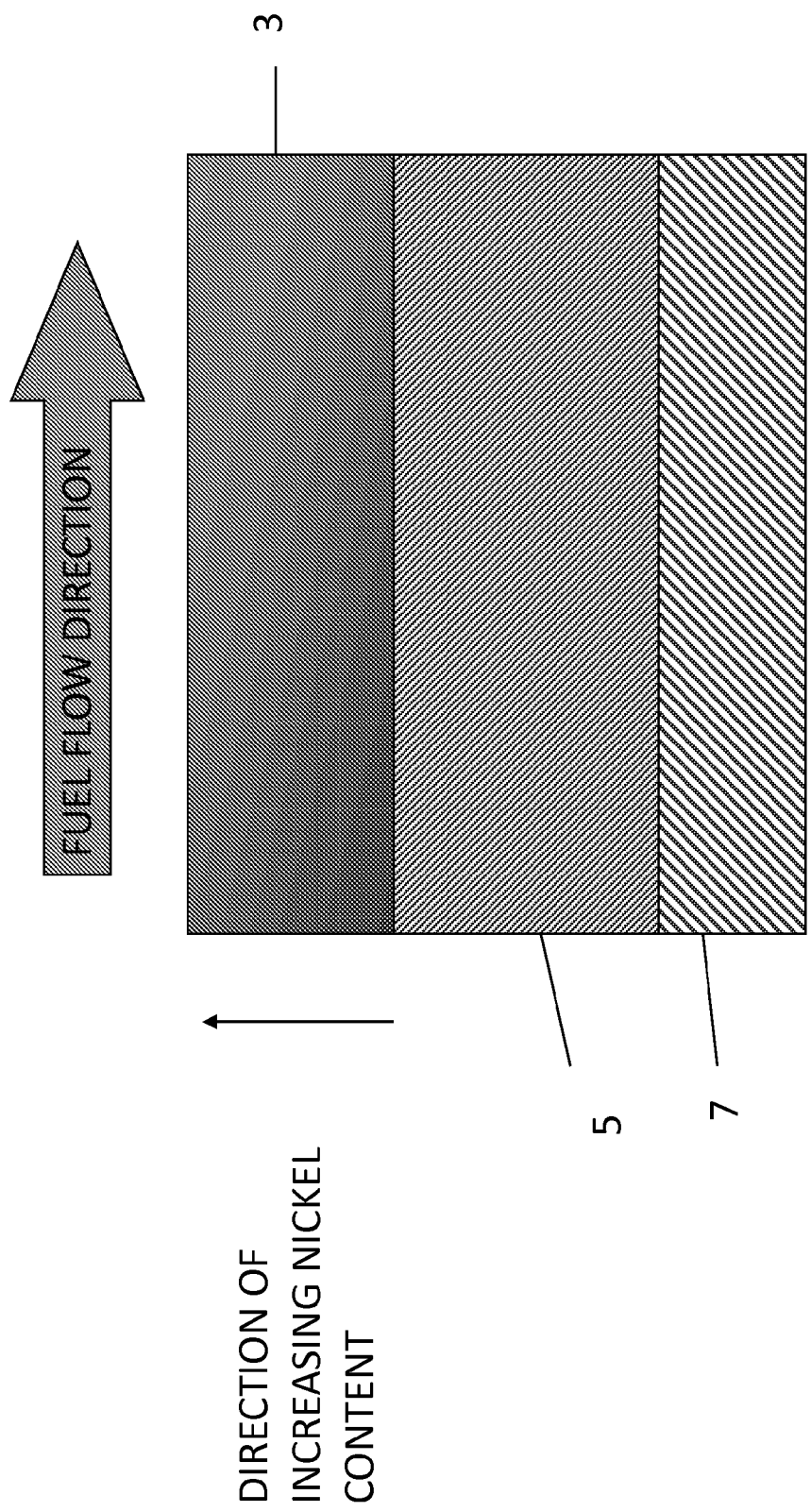
Figure 3:
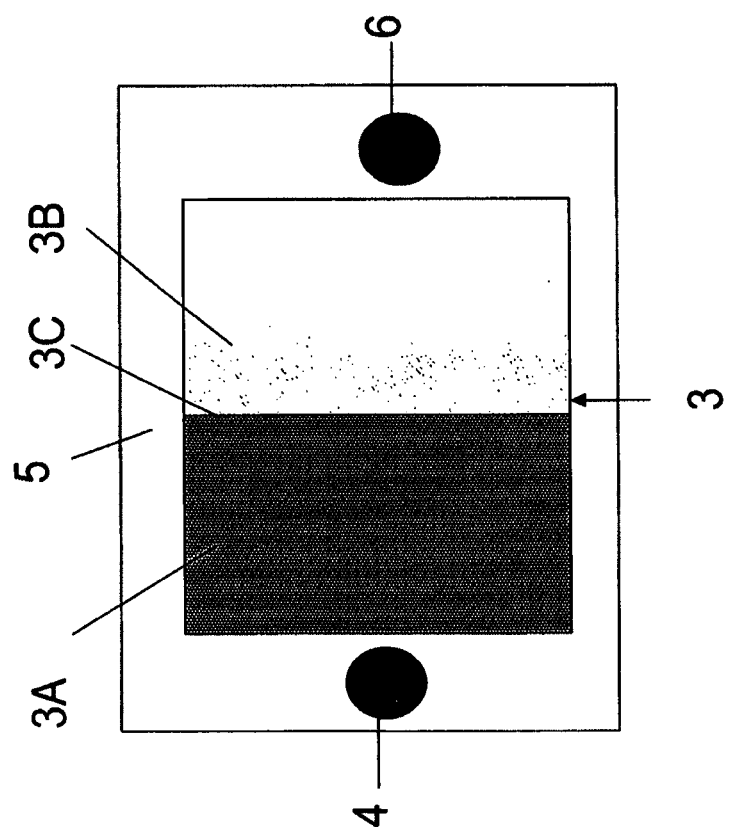

A method of forming a planar, electrolyte supported SOFC 1 shown in FIGS. 1, 2 and 3 includes forming the cathode electrode 7 on a first side of a planar solid oxide electrolyte 5 and forming the cermet anode electrode 3 on a second side of the planar solid oxide electrode, such that a first portion of the anode electrode adjacent to the electrolyte contains a lower porosity and a lower ratio of the nickel containing phase to the ceramic phase than the second portion of the anode electrode located distal from the electrolyte. The anode and the cathode may be formed in any order on the opposite sides of the electrolyte.

The anode electrode containing a plurality of sublayers shown in FIG. 1 may be formed by a screen printing method or by other suitable methods. For example, a first sublayer 13 containing a low porosity and a low nickel content can be screen printed on the electrolyte 5, followed by screen printing a second sublayer 23 with a higher porosity and a higher nickel content on the first sublayer 13.

The fabrication of the anode with a Ni—Co alloy can be achieved by first synthesizing a $Ni_{1-x}Co_xO$ powder with the desired stoichiometry and mixing it with a desired amount of SDC powder. For example, $0.05 \leq x \leq 0.3$. Standard ink processing (i.e., mixing the powders with the ink solvent), ink deposition, and sintering steps can be used for anode fabrication. During anode reduction, the $Ni_{1-x}Co_xO$/SDC composite reduces to Ni—Co/SDC cermet and porosity. Alternatively, the Ni—Co alloy (i.e., a metal alloy rather than a metal oxide) can be produced in powder form, mixed with the SDC, deposited, and sintered in a reducing atmosphere to produce a similar anode compositionally with a different microstructure. Other alloying elements, such as Cu, may be used instead of or in addition to Co. Likewise, other ceramic materials, such as GDC, etc., may be used instead of or in addition to SDC.

The single layer anode electrode shown in FIG. 2 may be formed by ink jet printing or other suitable method. During the deposition, the nickel content and porosity is varied in different regions of the anode electrode to form an anode electrode with a graded composition. The graded composition may comprise a uniformly or a non-uniformly graded composition in a thickness direction of the anode electrode. In this case, the ratio of the nickel to doped ceria precursor material is increased as the thickness of the deposited layer increases. Furthermore, the anode composition can be graded uniformly or non-uniformly in a direction from a fuel inlet to a fuel outlet, such as by using plural nozzles which provide a different nickel/doped ceria ratio precursor materials to different regions of the anode electrode. As illustrated in FIGS. 2 and 3, a first region 3A of the anode electrode 3 located adjacent to a fuel inlet 4 may contain a lower ratio of the nickel containing phase to the ceramic phase than the second region 3B of the anode electrode located adjacent to a fuel outlet 6. The first 3A and second 3B regions may be located adjacent to a surface of the anode electrode distal from the electrolyte 5. The boundary line 3C between the regions 3A, 3B may have any shape.

Figure 5A:
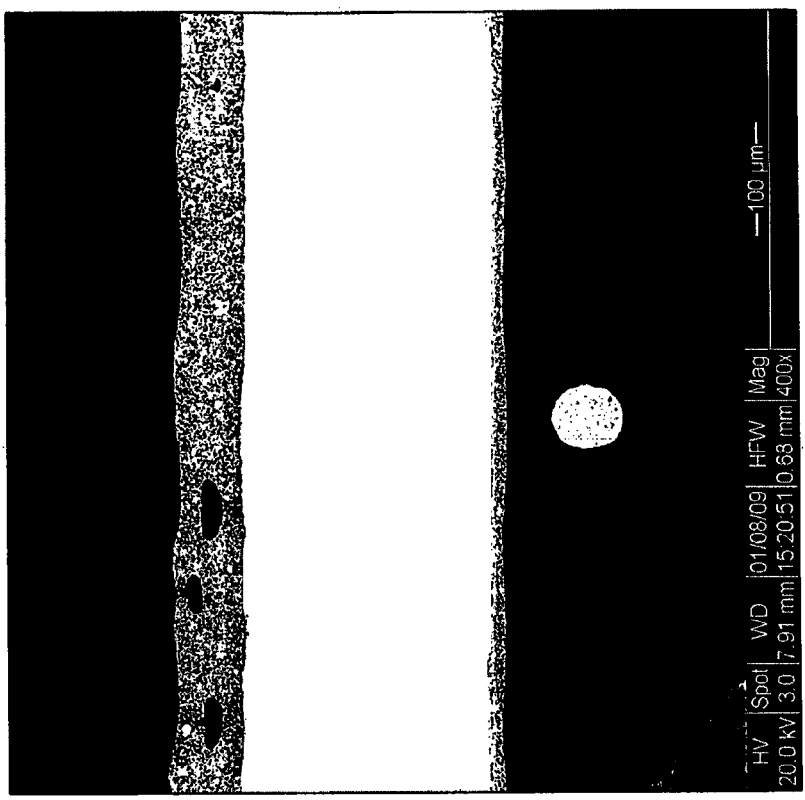
FIGS. 5A and 5B depict SEM images of anode electrode sub-layers in a solid oxide fuel.
Figure 5B:
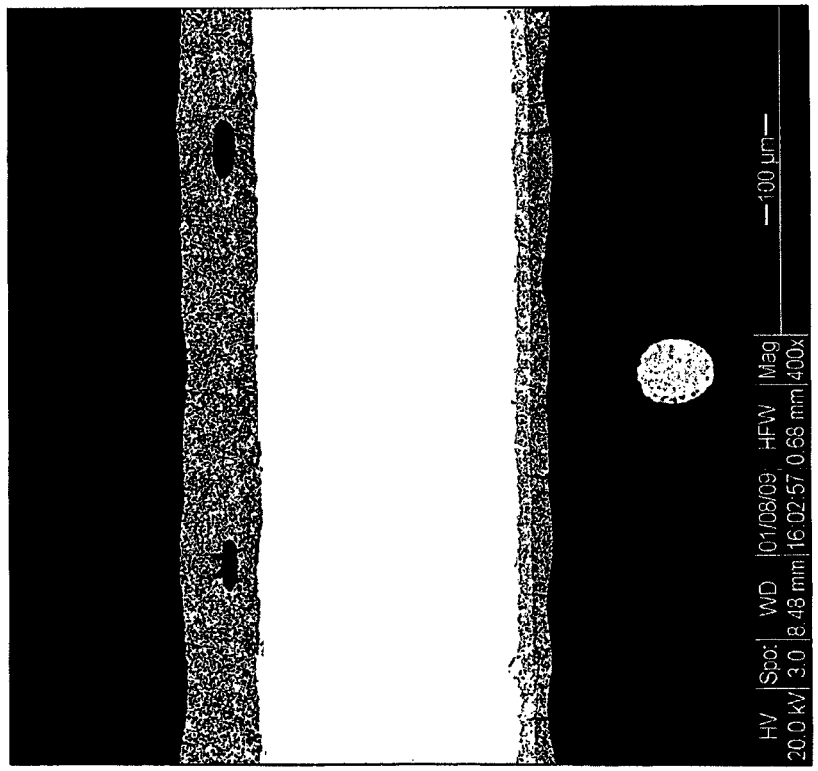

FIGS. 5A and 5B depict Scanning Electron Microscopy images of a SOFC oriented from cathode at the top of the image to anode at the bottom. The topmost layer in the image is the cathode electrode 7. The next layer is the electrolyte layer 5. The bottom layer is the anode 3. The anode is comprised of two sublayers 13 and 23. The SEM images show the condition of the anode sublayers after operation under conditions of fuel starvation using non-reformed hydrocarbon fuel.

FIG. 5A shows an image of a SOFC made according to a comparative example. The SOFC of the comparative example is described in U.S. application Ser. No. 11/907,204 filed on Oct. 10, 2007 and incorporated herein by reference in entirety. The SOFC of the comparative example lacks the Cu or Co in the upper sublayer 23. SOFC of the comparative example exhibits adequate performance. However, the image shows evidence of some of cracking.

FIG. 5B shows an image of a SOFC made according to an example of invention. The anode of the invention is thinner, e.g., about 9-16 microns, than the about 30 micron thick anode of the comparative example. The anode also contains cobalt substituting nickel in the upper sublayer. The anode of the example of the invention shows no evidence of structural or mechanical failure, such as cracking, delamination or dusting. Without wishing to be bound by a particular theory, the inventors attribute this change to the addition of Co to the nickel phase, forming a Ni—Co alloy. The decreased Ni concentration is believed to decrease the catalytic activity on the surface of the anode resulting in the spreading of the reformation reaction across the surface of the anode rather than having the reformation reaction be limited to the leading edge of the anode. Because the reaction is dispersed, the thermo-mechanical stresses are significantly decreased. Therefore, the anode of the example of the invention suffers less or no damage compared to the anode of the comparative example.

Figure 6:
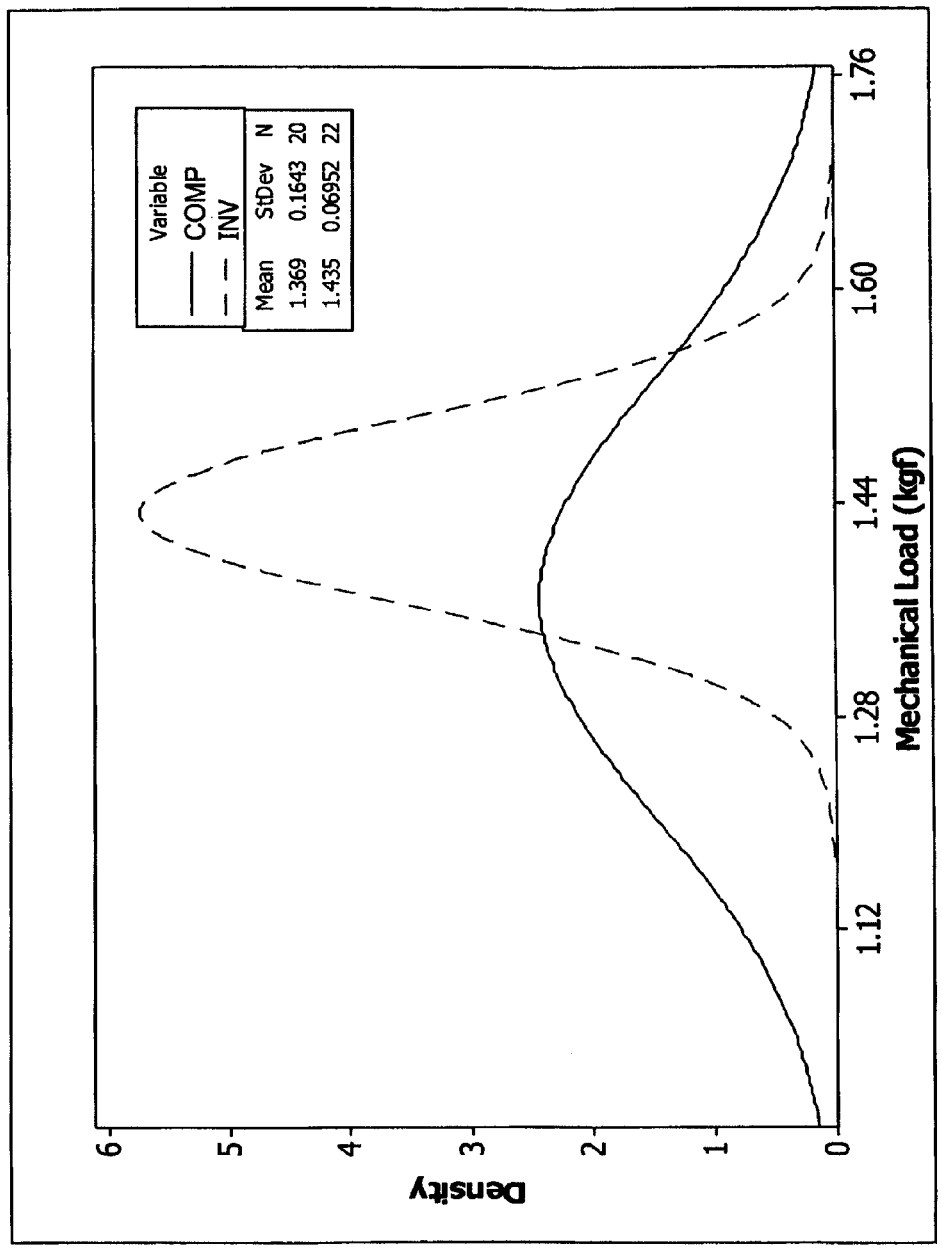
FIG. 6 is a plot of mechanical load testing data for cells according to a comparative example and an example of the invention.

FIG. 6 shows the results of mechanical load testing. The testing consisted of four point bend test of cells with the anode only. The graph plots the results for the comparative example (line "COMP") as well as the example of the invention (line "INV"). The plot of the results of the comparative example reveals a mean mechanical load of 1.369 kgf with a standard deviation of 0.16943. The plot of the data from the example of the invention shows a mean mechanical load of 1.435 kgf with a standard deviation is 0.06952. While both types of cells showed acceptable results, the cells of the example of the invention showed results which were consistent every time in their failure load, while the comparative example cells showed many outliers and generally inconsistent behavior. The cells of the example of the invention have a higher mean load to failure as well as the consistency, which is indicative that the interface between the electrolyte and electrode is better than in the comparative example cells. This may be attributed to less or no cracking of the anode of the example of the invention.

Figure 7:
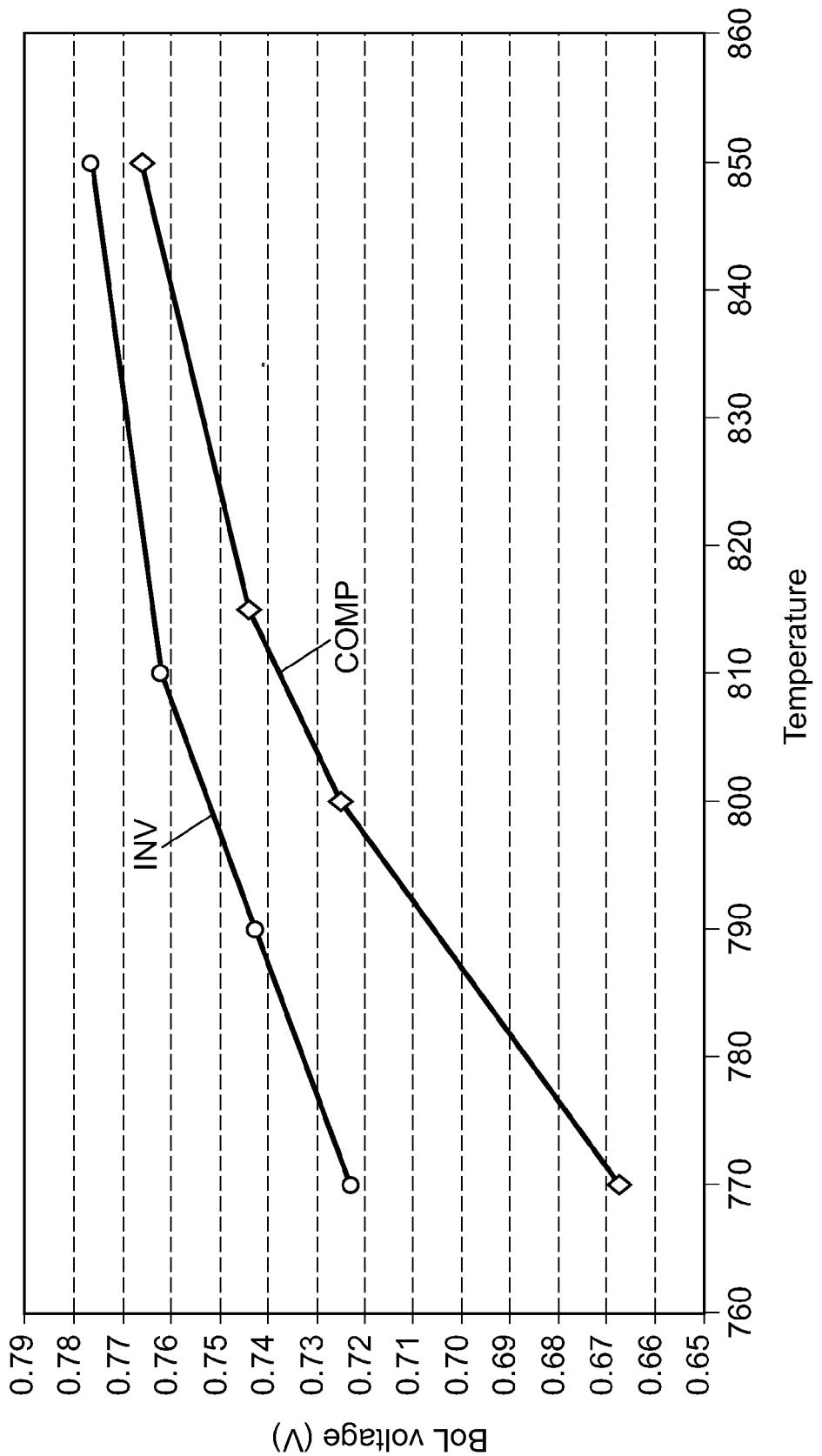
FIG. 7 is a plot of the beginning of life median output voltage for a compilation of several stacks while varying temperature for stacks according to a comparative example and an example of the invention.

FIG. 7 depicts a plot of the median voltage compliance results at 30 amp operation for several fuel cell stacks according to the comparative example and the example of the invention. One stack tested contained some cell made according to the comparative example and other cells made according to the example of the invention. The data characterizes output voltage potential versus temperature for the stacks at beginning of life under operating conditions. Output potential was measured as temperature was varied from 770° C. to 850° C., with a steam to methane (e.g., carbon) ratio of 1.9, and fuel utilization of 90%. The results show higher output potential for the invention (such as an about 60 mV higher potential), thus providing an improved result in comparison to the sufficient results of the comparative example. The comparative example data at 770° C. indicates evidence of some coking, which is not observed for the example of the invention at the same temperature.

Figure 8:
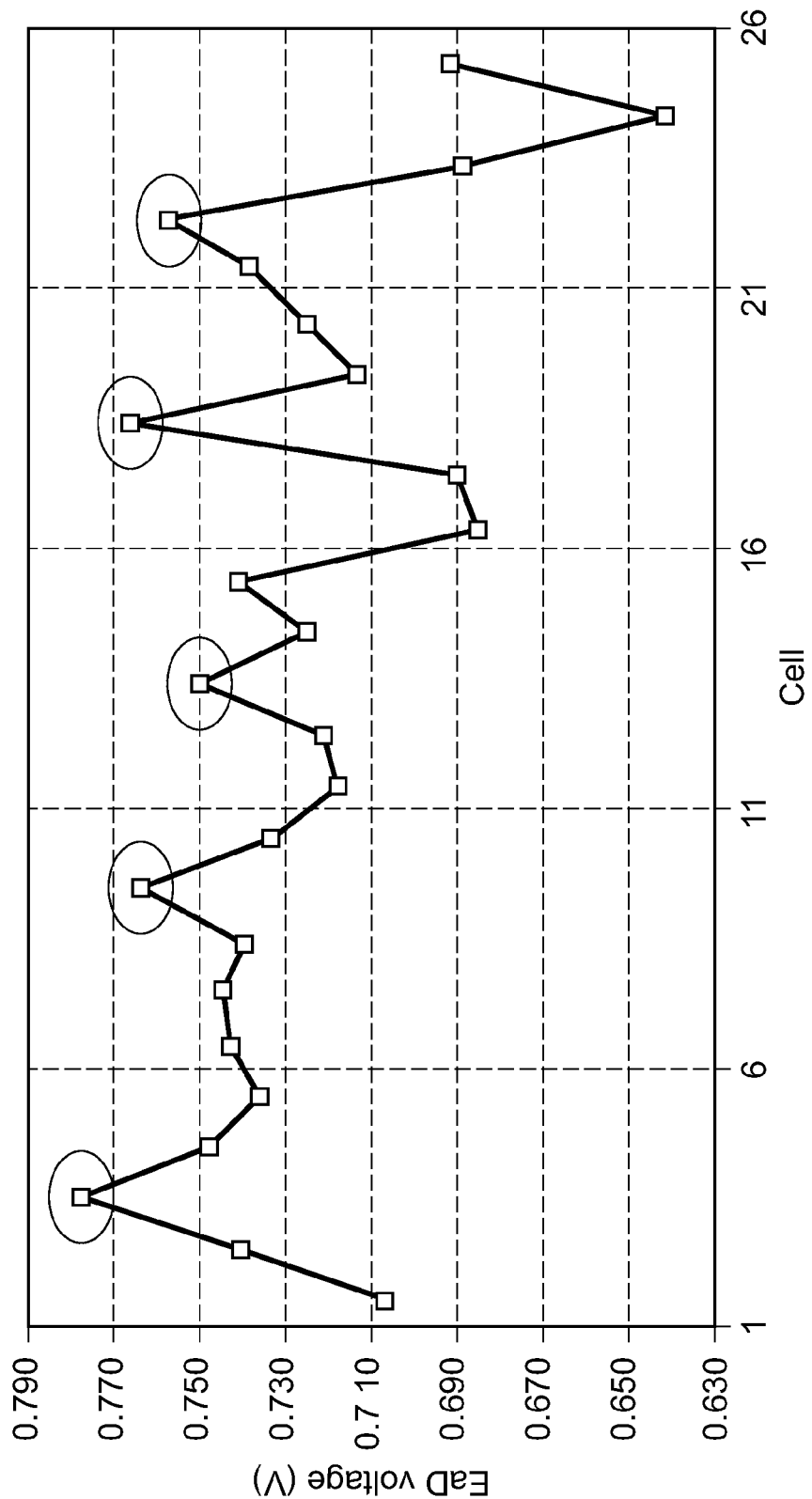
FIG. 8 is a plot of cell potential after 200 hours of operation for a 25 cell stack containing cells according to a comparative example (un-circled) and an example of the invention (circled).

FIG. 8 is a graph of output voltage for a 25 cell stack containing cells according to both the comparative example and the example of the invention after 200 hours of operation at fuel utilization of 75% and operating at 850° C. The circled data points indicate the output voltage results for cells of the example of the invention after 200 hours of operation. The un-circled data points indicate the output voltage results for cells of the comparative example after 200 hours of operation. Of note is the cells of the invention all show a lower degree of degradation of output potential after operation than the stacks of a comparative example.

Figure 9:
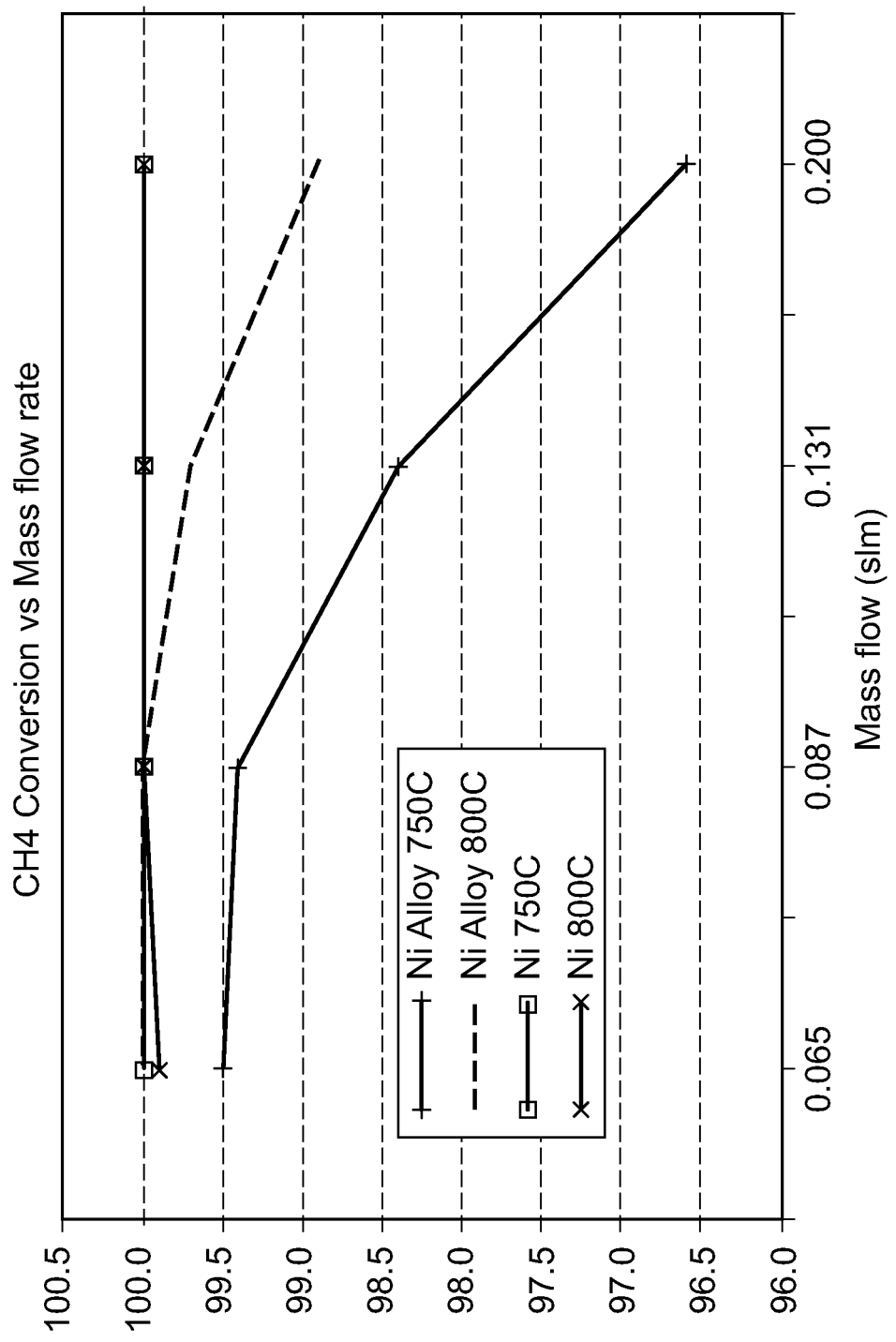
FIG. 9 is a graph of methane conversion versus mass flow rate for pure nickel of the comparative example and for a Ni—Co alloy of the example of the invention at 750 and 800° C.

FIG. 9 is a graph of methane conversion versus mass flow rate of natural gas (in standard liters per minute) for pure nickel of the comparative example and for a Ni—Co alloy (10 atomic percent Co, 90 atomic percent Ni) of the example of the invention at 750 and 800° C. As can be seen from the figure, the electrocatalytic reformation conversion of pure Ni is higher compared to a Ni—Co alloy where the volume fraction of metal and ceramic are identical for the two second layers 23. The higher the mass flow, the more efficient the catalyst has to be to reform all the methane. The Ni—Co catalyst provides a slower catalytic reaction because methane is detected at a lower mass flow rate.

The anode electrode contains a doped ceria phase rich interface at a three phase boundary with the electrolyte and a rich nickel phase region adjacent to the "free" surface of the anode electrode which is distal from the electrolyte (i.e., the surface of the anode 3 which faces the interconnect 9). Without wishing to be bound by a particular theory, the present inventors believe that the greater stability of the anode electrodes of the embodiments of the present invention under conditions of very high fuel utilization can be primarily attributed to the presence of the ceria rich interface at the three phase boundary. The mixed ionic and electronic conducting nature of the doped ceria acts as a buffer to the oxygen ion flux through the electrolyte, thus mitigating the rapid conversion of nickel to nickel oxide. Mechanical damage of the electrode/electrolyte is avoided and upon the establishment of normal operating conditions, minimal polarization change in the anode is observed. Because the ceria-based ceramic has a lower electronic conductivity than nickel, the presence of a small amount of nickel improves the conductivity of the first sublayer(s) without causing any deleterious effect to the mechanical stability under fuel starvation conditions.

The anode electrode further contains a metal rich region of a nickel alloy distal from the electrolyte. The inventors believe that decreasing the nickel concentration will disperse the steam reforming active region of the anode away from the leading edge. Because nickel is such a strong electrocatalyst, it is believed the high Ni concentration results in a majority of the reforming occurring within a few centimeters of the anode's length (i.e., at the leading edge where the hydrocarbon fuel enters the anode space between the anode and the interconnect). The elevated concentration of highly endothermic steam reforming results in thermo-mechanical stress and anode delamination. Partially deactivating the Ni catalyst by replacing it with a less catalytic or non-catalytic metal, such as Cu and/or Co in the entire upper anode sublayer, allows the reforming reaction to be spread over the entire length (i.e., area) of the anode surface from fuel inlet to outlet, and decreases the high temperature gradient. The decreased temperature gradient results in lower thermo-mechanical stress at the leading edge of the cell thereby minimizing the cause of the anode delamination and failure mechanism. This also lowers the dusting and Ni carbide formation. Furthermore, since the doped ceria ceramic phase of the anode, such as SDC, is electrocatalytically active, the total catalytic activity of the anode is not significantly reduced.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A solid oxide fuel cell (SOFC), comprising:
a cathode electrode;
a solid oxide electrolyte consisting essentially of stabilized zirconia; and
an anode electrode comprising a first layer and a second layer, such that the first layer is in physical contact with the stabilized zirconia solid oxide electrolyte and located between the stabilized zirconia solid oxide electrolyte and the second layer;
wherein:
the anode electrode comprises a cermet comprising a nickel containing phase and a ceramic phase;
the first layer of the anode electrode contains a lower ratio of the nickel containing phase to the ceramic phase than the second portion of the anode electrode;
the nickel containing phase in the second layer of the anode electrode comprises nickel and Cu which has a lower electrocatalytic activity than nickel, and
the first layer lacks intentionally introduced Cu.

2. The solid oxide fuel cell of claim 1, wherein the ceramic phase comprises a doped ceria phase.

3. The solid oxide fuel cell of claim 2, wherein the doped ceria phase comprises Sm, Gd or Y doped ceria phase.

4. The solid oxide fuel cell of claim 3, wherein the doped ceria phase composition comprises $Ce_{(1-x)}A_xO_2$ where A comprises at least one of Sm, Gd, or Y, and x is greater than 0.1 but less than 0.4.

5. The solid oxide fuel cell of claim 4, wherein the doped ceria phase comprises a Sm doped ceria phase.

6. The solid oxide fuel cell of claim 3, wherein the first layer comprises a first sublayer in contact with the electrolyte and the second layer comprises a second sublayer located over the first sublayer.

7. The solid oxide fuel cell of claim 6, wherein the first sublayer contains a lower porosity than the second sublayer.

8. The solid oxide fuel cell of claim 7, wherein the nickel containing phase contains an alloy of nickel and Cu.

9. The solid oxide fuel cell of claim 8, wherein:
the nickel containing phase in the second sublayer comprises 1 to 50 atomic percent of Cu and balance nickel;
the first sublayer contains between 1 and 15 volume percent of the nickel containing phase, between 5 and 30 volume percent pores and remainder the doped ceria phase; and the second sublayer contains between 20 and 60 volume percent nickel containing phase, between 20 and 60 volume percent pores and remainder the doped ceria phase.

10. The solid oxide fuel cell of claim 7, wherein:
the nickel containing phase in the second sublayer comprises 5 to 10 atomic percent of Cu and balance nickel;
the first sublayer contains between 5 and 25 weight percent of the nickel containing phase and between 75 and 95 weight percent of the doped ceria containing phase; and
the second sublayer contains between 60 and 85 weight percent of the nickel containing phase and between 15 and 40 weight percent of the doped ceria containing phase.

11. The solid oxide fuel cell of claim 3, wherein the second layer of the anode electrode has a higher porosity than first layer of the anode electrode.

\* \* \* \* \*